April 24, 1951 W. A. WILLIAMS 2,550,511
ADJUSTABLE PULLEY
Filed July 25, 1946 4 Sheets-Sheet 1

WITNESSES
Thomas W. Kerr, Jr.
George L. Combs

INVENTOR:
William A. Williams,
BY Paul & Paul
ATTORNEYS.

April 24, 1951 W. A. WILLIAMS 2,550,511
ADJUSTABLE PULLEY
Filed July 25, 1946 4 Sheets-Sheet 2

WITNESSES
INVENTOR:
William A. Williams,
BY Paul & Paul
ATTORNEYS.

April 24, 1951     W. A. WILLIAMS     2,550,511
ADJUSTABLE PULLEY
Filed July 25, 1946     4 Sheets-Sheet 3
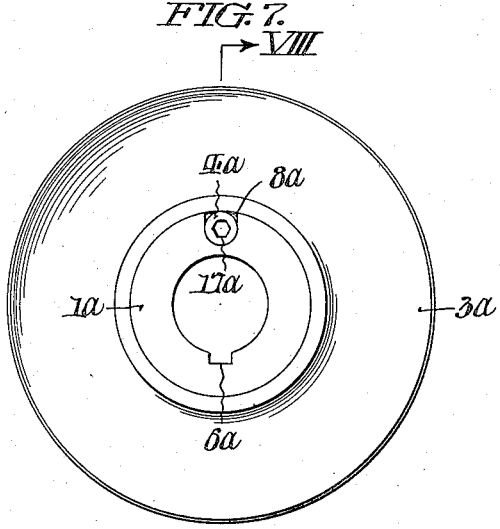
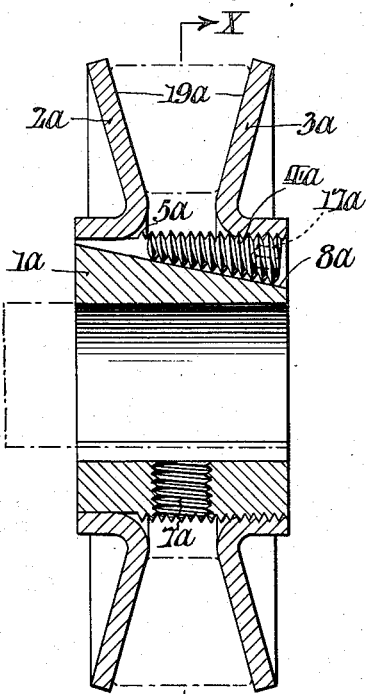
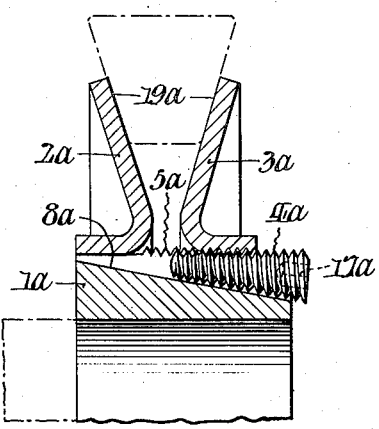
INVENTOR:
William A. Williams,
BY Paul & Paul
ATTORNEYS.

April 24, 1951 W. A. WILLIAMS 2,550,511
ADJUSTABLE PULLEY
Filed July 25, 1946 4 Sheets-Sheet 4

WITNESSES
INVENTOR:
William A. Williams,
BY
ATTORNEYS.

Patented Apr. 24, 1951

2,550,511

UNITED STATES PATENT OFFICE 2,550,511

ADJUSTABLE PULLEY

William A. Williams, Philadelphia, Pa., assignor to The American Pulley Company, Philadelphia, Pa., a corporation of Pennsylvania Application July 25, 1946, Serial No. 686,058

3 Claims. (Cl. 74—230.17)

This invention relates to adjustable pulleys and more particularly to variable diameter pulleys of the type wherein an annular V-shaped groove for a belt is formed by oppositely inclined faces of two flanges having capacity for relative axial movement for varying the effective diameter of the pulley. Heretofore it has been proposed to provide various formations of special shape on the flange and hub elements of such a pulley involving difficult and expensive manufacturing operations so that the cost of making a variable diameter pulley has been very much greater than cost of a pulley of a fixed diameter.

The principal object of the present invention is to provide an adjustable diameter pulley which is simple and rugged in construction with the parts so designed that they may be fabricated and assembled at a cost not greatly exceeding the cost of a pulley of fixed diameter.

A further object of the invention is to provide simple and efficient means for locking the movable flange of such a pulley in any selected position according to the axial spacing required to produce the desired effective pulley diameter, and at the same time to provide locking means of such character that the movable flange may be readily unlocked and readjusted as necessary.

Other objects and advantages characterizing my invention will become more apparent from the description of two practical embodiments of the invention which is hereinafter set forth with reference to the accompanying drawings, whereof:

Fig. 7 is a side elevation of a second form of my improved pulley;

Fig. 8 is an enlarged vertical cross section of the second form of pulley taken as indicated by the arrows VIII—VIII of Fig. 7;

Fig. 9 is a fragmentary section similar to Fig. 8 but showing only the upper half of the pulley with the movable flange locked in a different position closer to the fixed flange;

Figure 1:
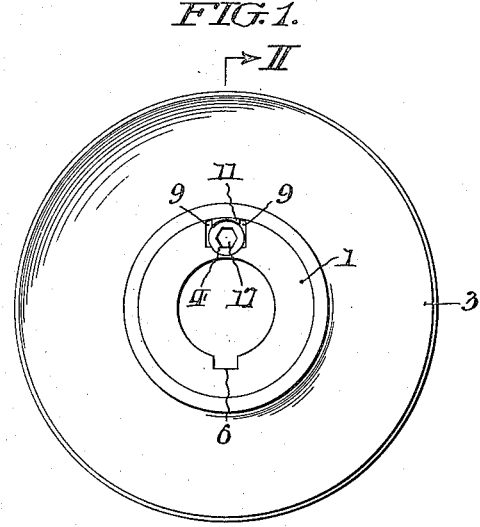
Fig. 1 is a side elevation of one form of my improved pulley.

In the embodiment of the invention shown in Figs. 1 to 6 the pulley comprises a hub 1, a pair of flanges 2, 3, and a locking screw 4.

The hub 1 is externally threaded throughout a portion of its length as indicated at 5, that portion of the circumference being unthreaded which is engaged by the fixed flange 2. By means of a keyway 6 and a set screw (not shown) applied to a threaded opening 7 extending radially through the center of the hub the pulley may be readily affixed to a shaft such as shown in dot and dash lines in Figs. 2 and 5. The hub is recessed to provide a longitudinal cavity 8 beneath the threaded surface at its periphery, this cavity being bored and formed with spaced parallel slots 9 in such manner as to form incidentally a flexible threaded tongue 11 bridging the top of the cavity. Desirably the slots 9 extend across the length of the hub 1 and the tongue 11 is supported by a relatively thin zone 12, see Figs. 2 and 5, where it merges with the hub so that it is capable of a sufficient outward flexure to grip the flange 3 firmly, and lock the same in any selected position with respect to the hub. The cavity 8 is threaded throughout a portion of its length, as indicated at 13, to accommodate the threaded end of the locking screw 4.

Figure 6:
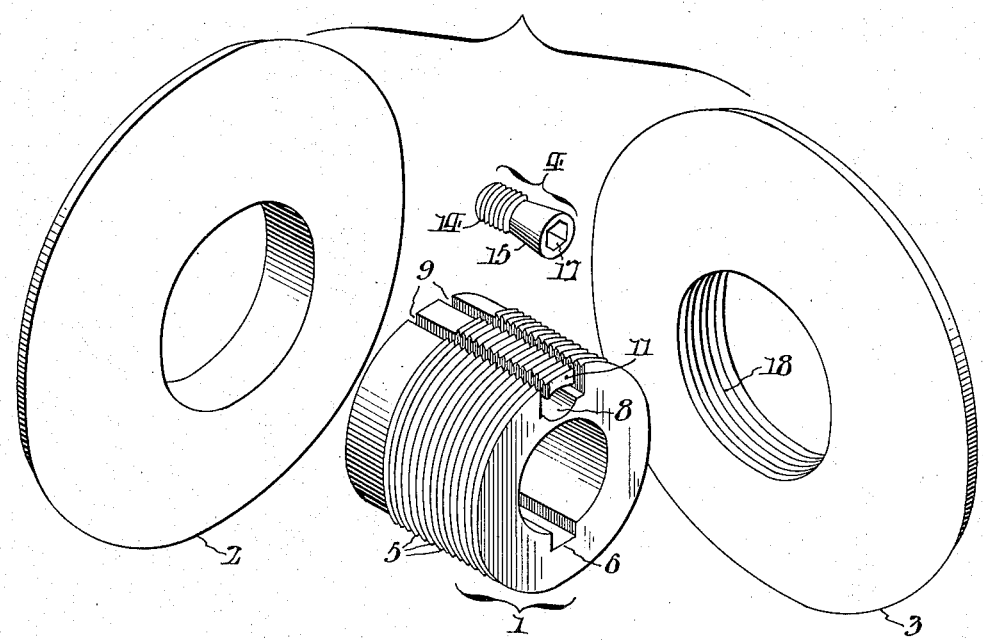
Fig. 6 is a perspective exploded view of the various parts of which the pulley shown in Fig. 1 is made.
Figure 10:
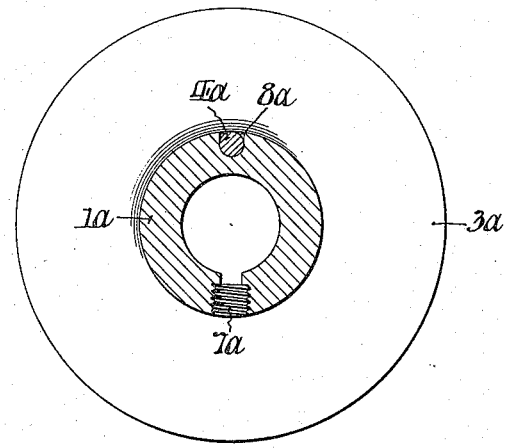
Fig. 10 is a vertical cross section of the second form of pulley taken as indicated by the arrows X—X of Fig. 8, but somewhat reduced in scale.
Figure 11:
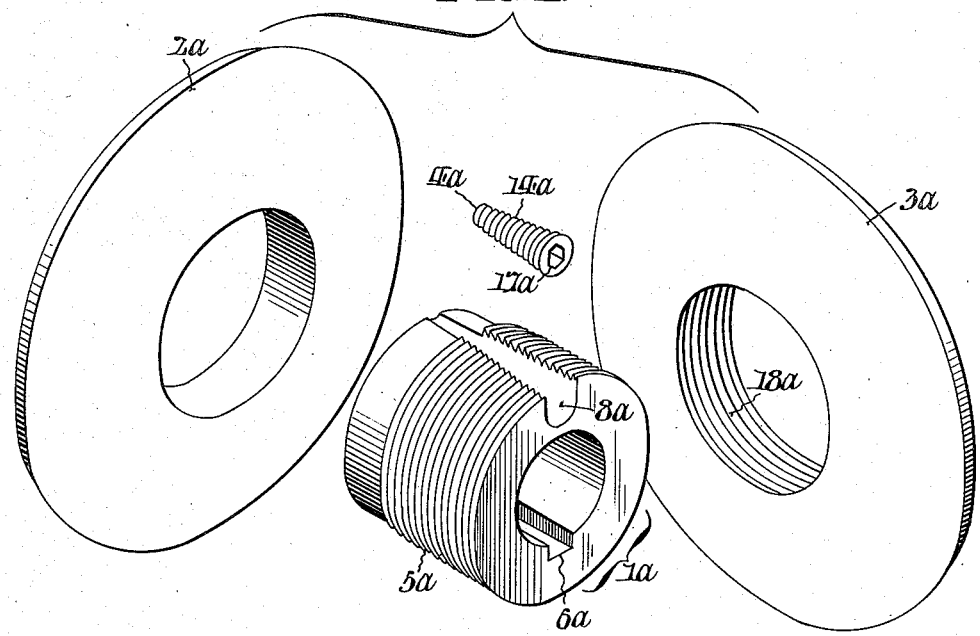
Fig. 11 is a perspective exploded view of the various parts of which the second form of pulley is made.

As shown most clearly in Fig. 6, the locking screw 4 has a helically cylindrical threaded portion 14 and a conical portion 15, the latter affording a wedge face adapted to bear against the end of the flexible tongue 11 which is tapered at its inner surface, as indicated at 16, to provide a complementary surface at the area of such engagement. The taper is such that the tongue 11 diminishes in thickness towards its free end. A hexagonal socket 17 formed in the end of the locking screw 4 serves as a means for applying a tool for turning the screw. It will be apparent, however, that the exposed end of the locking screw 4 which is accessible at the end of the hub 1 may be formed in many different ways to permit the application thereto of a device for turning the screw.

Figure 2:
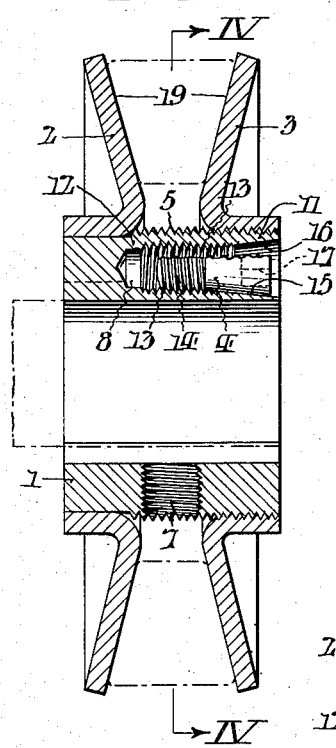
Fig. 2 is an enlarged vertical cross section of the same taken as indicated by the arrows II—II of Fig. 1.
Figure 3:
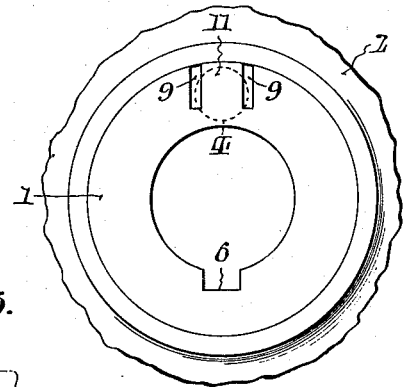
Fig. 3 is an enlarged fragmentary view of the same taken at the side opposite to that shown in Fig. 1 and showing one end of the hub and a portion of a surrounding flange.
Figure 5:
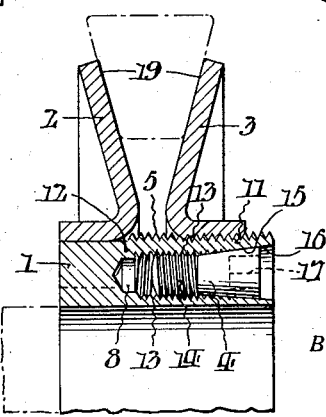
Fig. 5 is a fragmentary cross section similar to Fig. 2 but showing only the upper half of the pulley with the movable flange locked in a different position closer to the fixed flange.
Figure 4:
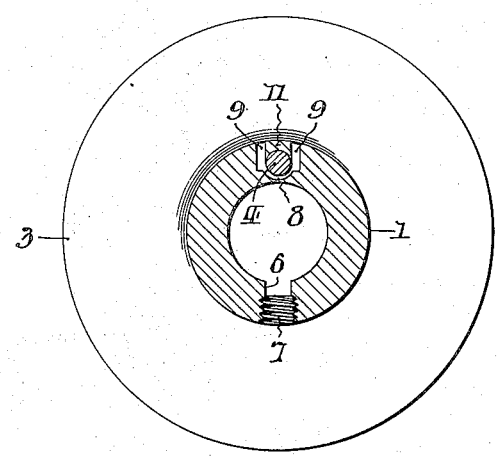
Fig. 4 is a vertical cross section of the pulley taken as indicated by the arrows IV—IV of Fig. 2 but somewhat reduced in scale.

Each flange 2, 3 is a counterpart of the other except that the movable flange 3 has threads 18 at the portion thereof which engages the hub 1. By virtue of this simplified design the flanges 2, 3 may be made of pressed steel. In a manner well known to those skilled in the art flat discs from which the flanges 2, 3 are to be made may be pressed to the shape shown in Figs. 2 and 5 and thus produced from the same set of dies at a relatively low cost. The fixed flange 2 is pressed on to the unthreaded peripheral portion of the hub 1 and thus firmly secured thereto, while the movable flange by virtue of its threaded engagement with the hub can be moved from one position, such as represented in Fig. 2, to another, such as represented in Fig. 5. It will be readily apparent that the oppositely inclined faces 19 of the flanges 2, 3 produce V-shaped annular grooves which may be engaged by a belt of wedge-shaped cross section, as shown in dot and dash lines on Figs. 2 and 5, and that relative movement of the flanges will cause the effective diameter of the pulley to be increased or diminished.

If it is desired to readjust the position of the movable flange 3, the locking screw 4 is loosened causing the flexible tongue 11 to spring inwardly to its normal position and permitting the flange 3 to turn with respect to the hub 1. When the flange 3 has by turning been moved to the selected position for producing the required effective diameter for the pulley it is locked in place by tightening the locking screw 4. Although the external threads on the tongue 11 form a substantial continuation of the threads 5 at the periphery of the hub and are similarly pitched, it is found that a sufficient wedging pressure can be exerted by the locking screw 4 to hold the movable flange 2 against dislodgement until and unless the locking screw is unseated by loosening the same with a wrench or the like.

In the second form of the invention shown in Figs. 7 to 11 the parts of the pulley are correspondingly designated. The flanges 2a, 3a are in all respects similar to flanges 2 and 3 as previously described and are applied to the hub 1a in the same manner. The hub 1a is also provided with a keyway 6a and a threaded hole 7a for a set screw, and is circumferentially threaded throughout a portion of its length as indicated at 5a.

The hub 1a is also recessed to provide a cavity 8a, but differing from the first form of the invention the cavity 8a is in the form of a groove at the surface of the hub, the groove being relatively wide and deep at one end and diminishing in width and depth towards the other end. The cavity 8a is thus adapted to accommodate a conical locking screw 4a. The base of the cavity 8a need not be threaded if a locking screw of relatively hard metal is employed.

The conical locking screw 4a preferably has a continuous helical thread 14a the pitch of which corresponds to the pitch of the threads 5a at the periphery of the hub 1a. At one end of the locking screw 4a there is a hexagonal socket 17a for application of a wrench to tighten or loosen the screw. When the locking screw 4a is inserted within the cavity 8a in the position represented in Fig. 9 the movable flange 3a is free to turn with respect to the hub 1a. Under these conditions the threads 14a of the locking screw 4a form a substantial continuation of the threads 5a of the hub 1a where the latter threads are interrupted at the cavity 8a. When, however, the locking screw 4a is turned in a clockwise direction, as viewed from its socketed end, its threads will engage the threads 18a of flange 3a causing the screw to be moved axially towards the fixed flange until it becomes wedged in place as represented in Fig. 8. As the locking screw 4a becomes more tightly wedged its threads 14a will bite into the base of the cavity 8a to a sufficient extent to prevent dislodgement of the screw by any force other than a turning force applied to the screw.

In both of the forms illustrated in the drawings herein the cylindrical hub has a cavity extending longitudinally thereof in the vicinity of its periphery and with an arcuately grooved base, and in both examples the wedging device consists of a helically threaded screw which is conically formed, either in whole or in part, and which fits within the cavity in such manner that a small amount of torque applied to the screw will produce a firm lock between the hub and the movable flange insuring against any relative movement between the two flanges until the screw is loosened.

Although I have described two embodiments of the invention in some detail, it will be apparent that various modifications may be made in the form of the pulley of this invention, especially with respect to the manner in which the locking screw is interposed between the hub and movable flange; and that the shape of the hub and the flanges thereon may be considerably varied, all without departing from the spirit of the invention as defined in the annexed claims.

Having thus described my invention, I claim:

1. An adjustable diameter pulley comprising a cylindrical hub externally threaded throughout a portion of its length, a flange fixed to the unthreaded portion of said hub, a movable flange having threads engaging the threaded portion of the hub, a longitudinally extending cavity formed in the threaded portion of the hub with the axis of the cavity spaced radially from the axis of the hub, a tongue formed at the outer portion of the cavity by spaced parallel longitudinally extending slots which intersect the cavity, said tongue having capacity for movement relative to the hub, and a screw mounted in said cavity in threaded engagement with the hub and having a conical wedge face engaging the tongue whereby the tongue may be moved outwardly to lock the movable flange in selected positions on the hub.

2. The invention of claim 1 characterized further by the fact that said tongue is tapered on its inner surface to correspond with the taper of the conical wedge face and has external threads forming a substantial continuation of the threads of the hub.

3. The invention of claim 1 characterized further by the fact that said tongue is mounted on the hub with capacity for flexure under pressure from the screw mounted in the cavity.

WILLIAM A. WILLIAMS.

REFERENCES CITED

The following references are of record in the file of this patent:

UNITED STATES PATENTS

| Number | Name | Date |
| --- | --- | --- |
| 688,706 | Sigafus | Dec. 10, 1901 |
| 793,402 | Storsberg | June 27, 1905 |
| 886,197 | Filetz | Apr. 28, 1908 |
| 1,879,290 | Johnson | Sept. 27, 1932 |
| 2,254,380 | Mitchell | Sept. 2, 1941 |